United States Patent
Chandrasekhar et al.

(10) Patent No.: US 10,524,007 B1
(45) Date of Patent: Dec. 31, 2019

(54) MACHINE LEARNING BASED PACKET SERVICE CLASSIFICATION METHODS FOR EXPERIENCE-CENTRIC CELLULAR SCHEDULING

(71) Applicant: Samsung Electronics Co., Ltd., Suwon-si, Gyeonggi-do (KR)

(72) Inventors: Vikram Chandrasekhar, Austin, TX (US); Yuqiang Heng, Mountain View, CA (US); Jianzhong Zhang, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/221,292

(22) Filed: Dec. 14, 2018

Related U.S. Application Data

(60) Provisional application No. 62/688,452, filed on Jun. 22, 2018, provisional application No. 62/703,253,
(Continued)

(51) Int. Cl.
*H04N 21/462* (2011.01)
*H04N 21/61* (2011.01)
(Continued)

(52) U.S. Cl.
CPC ....... *H04N 21/4621* (2013.01); *G06N 3/0481* (2013.01); *G06N 20/20* (2019.01); *H04L 47/196* (2013.01); *H04L 47/2441* (2013.01); *H04L 65/4084* (2013.01); *H04N 21/23439* (2013.01); *H04N 21/6125* (2013.01); *H04N 21/8456* (2013.01); *H04L 65/80* (2013.01)

(58) Field of Classification Search
CPC ..... H04L 47/32; H04L 47/10; H04L 47/2441; H04L 47/29
USPC .......................................................... 375/240
See application file for complete search history.

(56) References Cited

U.S. PATENT DOCUMENTS

| 7,660,248 | B1 | 2/2010 | Duffield et al. |
| 7,782,793 | B2 * | 8/2010 | Olesinski ............ H04L 41/0893 370/253 |

(Continued)

OTHER PUBLICATIONS

Wei Li, et al., Computer Laboratory, University of Cambridge; "Efficient Application Identification and the Temporal and Spatial Stability of Classification Schema." Oct. 16, 2008. 41 pages.
(Continued)

*Primary Examiner* — Leila Malek

(57) ABSTRACT

Methods and apparatus for classifying a traffic packet service of a traffic flow to a client device, a state and/or video resolution of a streaming video player in a client device. The apparatus includes a memory, and a communication interface configured to obtain TCP/IP or UDP/IP headers of packets to a client device, at least one processor operably connected to the memory, the at least one processor configured to detect a start of a traffic flow, and buffer a first number of packets for the traffic flow, extract features from UDP/IP or TCP/IP headers of a second number of packets belonging to the detected traffic flow, and obtain a flow service classifier for classifying a service type of the traffic flow, and classify the service type of the traffic flow by applying the extracted features to the flow service classifier.

20 Claims, 6 Drawing Sheets

Related U.S. Application Data filed on Jul. 25, 2018, provisional application No. 62/732,244, filed on Sep. 17, 2018, provisional application No. 62/732,259, filed on Sep. 17, 2018.

(51) Int. Cl.

| | | |
|---|---|---|
| *H04N 21/2343* | (2011.01) | |
| *H04N 21/845* | (2011.01) | |
| *H04L 12/851* | (2013.01) | |
| *H04L 12/801* | (2013.01) | |
| *G06N 20/20* | (2019.01) | |
| *G06N 3/04* | (2006.01) | |
| *H04L 29/06* | (2006.01) | |

(56) References Cited

U.S. PATENT DOCUMENTS

| | | | |
|---|---|---|---|
| 9,392,247 B2 | 7/2016 | Chen et al. | |
| 2005/0141783 A1 | 6/2005 | Chen et al. | |
| 2008/0316922 A1* | 12/2008 | Riddle | H04L 41/0893 370/230 |
| 2009/0083517 A1* | 3/2009 | Riddle | G06F 9/526 712/30 |
| 2009/0161547 A1* | 6/2009 | Riddle | G06F 9/526 370/236 |
| 2014/0269718 A1* | 9/2014 | Goyal | H04L 45/74 370/392 |
| 2014/0372616 A1* | 12/2014 | Arisoylu | H04L 67/1002 709/226 |

OTHER PUBLICATIONS

Ang Kun Joo Michael, et al., Technical Report, UCAM-CL-TR-912, No. 912; University of Cambridge Computer Laboratory; "Network Traffic Classification via Neural Networks." Sep. 2017. 25 pages.

Lei Yu, et al., "Feature Selection for High-Dimensional Data: A Fast Correlation-Based Filter Solution." Department of Computer Science & Engineering, Arizona State University, Tempe, AZ , 2003. 8 pages.

Dimitrios Tsilimantos, et al., "Classifying Flows and Buffer State for YouTube's HTTP Adaptive Streaming Service in Mobile Networks." Mathematical and Algorithmic Sciences Lab, Paris Research Center Huawei Technologies France. May 29, 2018. 13 pages.

Dimitrios Tsilimantos, et al., "Traffic Profiling for Mobile Video Streaming." Mathematical and Algorithmic Sciences Lab, France Research Center Huawei Technologies France SASU. May 24, 2017. 7 pages.

Theodoros Karagkioules, et al., "A Public Dataset for YouTube's Mobile Streaming Client." Paris Research Center, Huawei Technologies France LTCI, Telecom ParisTech, Universite Paris-Saclay, University of Wurzburg, Germany. 2018. 6 pages.

Ashwin Rao, et al., "Network Characteristics of Video Streaming Traffic." ACM CoNEXT 2011, Dec. 6-9, 2011, Tokyo, Japan. 7 pages.

Andrew W. Moore, et al., "Discriminators for use in flow-based classification" RR-05-13 ISSN 1470-5559, Queen Mary University of London Department of Computer Science. Aug. 2005. 16 pages.

* cited by examiner

MACHINE LEARNING BASED PACKET SERVICE CLASSIFICATION METHODS FOR EXPERIENCE-CENTRIC CELLULAR SCHEDULING

CROSS-REFERENCE TO RELATED APPLICATION AND CLAIM OF PRIORITY

This application claims priority under 35 U.S.C. § 119(e) to U.S. Provisional Patent Application No. 62/688,452 filed on Jun. 22, 2018; U.S. Provisional Patent Application No. 62/703,253 filed on Jul. 25, 2018; U.S. Provisional Patent Application No. 62/732,244 filed on Sep. 17, 2018; and U.S. Provisional Patent Application No. 62/732,259 filed Sep. 17, 2018. The above-identified provisional patent applications are hereby incorporated by reference in their entirety.

TECHNICAL FIELD

This disclosure relates generally to machine learning based flow service classification methods for experience-centric cellular scheduling. In addition, the disclosure provides machine learning schemes for detecting a state and video resolution of a streaming video player in a client device.

BACKGROUND

Streaming techniques have been developed continuously in the last few decades. We see rapid convergence of various multimedia services such as traditional TV, Internet Protocol TV (IPTV), video conferencing, live and mobile streaming services. At the same time, Internet has become a standard medium for multimedia delivery. The Hypertext Transfer Protocol (HTTP) on top of Transmission Control Protocol (TCP) has become the primary protocol for multimedia content delivery over the Internet. The streaming techniques of multimedia content such as videos have been greatly developed.

An efficient and accurate identification of the application category generating network traffic is essential for experience-centric scheduling for multimedia content streaming services.

SUMMARY

This disclosure provides a method and apparatus for classifying a traffic packet service of a traffic flow to a client device, a state and/or video resolution of the video player in the client device.

In a first embodiment, an apparatus for improving a service quality in a communication network is provided. The apparatus includes a memory, and a communication interface configured to obtain Transmission Control Protocol (TCP)/Internet Protocol (IP) or user datagram protocol (UDP)/IP headers of packets to a client device, at least one processor operably connected to the memory, the at least one processor configured to detect a start of a traffic flow; and buffer a first number of packets for the traffic flow, the first number of packets exceeding a first threshold, extract features from UDP/IP or TCP/IP headers of a second number of packets belonging to the detected traffic flow, the second number of packets exceeding a second threshold, and obtain a flow service classifier for classifying a service type of the traffic flow, and classify the service type of the traffic flow by applying the extracted features to the flow service classifier.

In a second aspect, a method for improving a service quality in a communication network is provided. The method includes detecting a start of a traffic flow to a client device, buffering a first number of packets for the traffic flow, the first number of packets exceeding a first threshold, extracting features from user datagram protocol (UDP)/Internet Protocol (IP) or Transmission Control Protocol (TCP)/IP headers of a second number of packets belonging to the detected traffic flow, the second number of packets exceeding a second threshold, obtaining a flow service classifier for predicting a service type of the traffic flow, and determining the service type of the traffic flow by applying the extracted features to the flow service classifier.

In a third aspect, a non-transitory computer-readable medium comprising program code for improving a service quality in a communication network is provided. The program code that, when executed by a processor, causes the processor to detect a start of a traffic flow to a client device, buffer a first number of packets for the traffic flow, the first number of packets exceeding a first threshold, extract features from user datagram protocol (UDP)/Internet Protocol (IP) or Transmission Control Protocol (TCP)/IP headers of a second number of packets belonging to the detected traffic flow, the second number of packets exceeding a second threshold, obtain a flow service classifier for predicting a service type of the traffic flow, and determine the service type of the traffic flow by applying the extracted features to the flow service classifier.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

FIGS. 1 through 7, discussed below, and the various embodiments used to describe the principles of this disclosure in this patent document are by way of illustration only and should not be construed in any way to limit the scope of the disclosure. Those skilled in the art will understand that the principles of this disclosure may be implemented in any suitably arranged wireless communication system.

Figure 1:
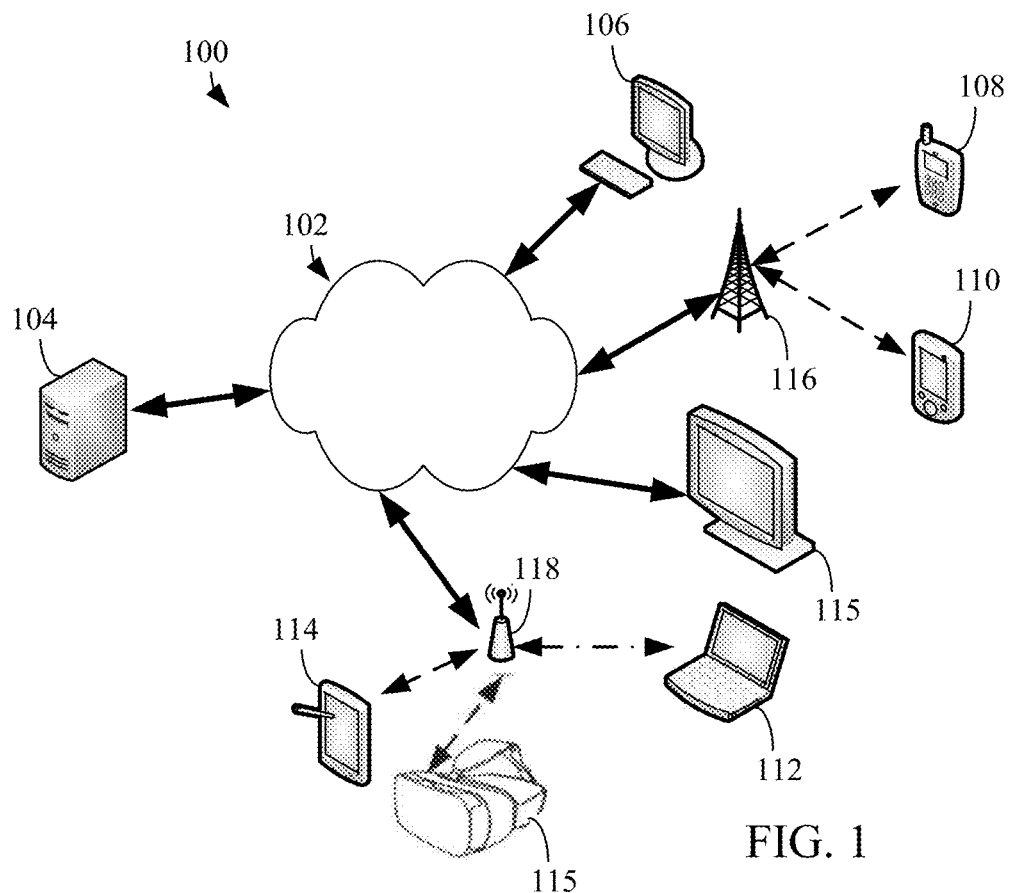
FIG. 1 illustrates an example computing system according to various embodiments of the present disclosure.

FIG. 1 illustrates an example computing system 100 according to this disclosure. The embodiment of the computing system 100 shown in FIG. 1 is for illustration only. Other embodiments of the computing system 100 could be used without departing from the scope of this disclosure.

As shown in FIG. 1, the system 100 includes a network 102, which facilitates communication between various components in the system 100. For example, the network 102 may communicate internet protocol (IP) packets, frame relay frames, asynchronous transfer mode (ATM) cells, or other information between network addresses. The network 102 may include one or more local area networks (LANs), metropolitan area networks (MANs), wide area networks (WANs), all or a portion of a global network such as the Internet, or any other communication system or systems at one or more locations.

The network 102 facilitates communications between at least one server 104 and various client devices 106-115. Each server 104 includes any suitable computing or processing device that can provide computing services for one or more client devices. Each server 104 could, for example, include one or more processing devices, one or more memories storing instructions and data, and one or more network interfaces facilitating communication over the network 102.

Each client device 106-115 represents any suitable computing or processing device that interacts with at least one server or other computing device(s) over the network 102. In this example, the client devices 106-115 include a desktop computer 106, a mobile telephone or smartphone 108, a personal digital assistant (PDA) 110, a laptop computer 112, a tablet computer 114, and a head-mounted display (HMD). However, any other or additional client devices could be used in the computing system 100.

In this example, some client devices 108-115 communicate indirectly with the network 102. For example, the client devices 108-110 communicate via one or more base stations 116, such as cellular base stations or eNodeBs. Also, the client devices 112-115 communicate via one or more wireless access points 118, such as IEEE 802.11 wireless access points. Note that these are for illustration only and that each client device could communicate directly with the network 102 or indirectly with the network 102 via any suitable intermediate device(s) or network(s).

In this illustrative embodiment, computing system 100 provides a view field-aware point cloud streaming service. For example, server 104 may represent a video processor that determines whether objects/nodes of 3D content are within the view field of the client device and streams 3D content based on the determination. Smartphone 108 may represent a video player that plays the 3D content on for example, a head-up displayer in a virtual reality or augment reality mode.

Although FIG. 1 illustrates one example of a computing system 100, various changes may be made to FIG. 1. For example, the system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
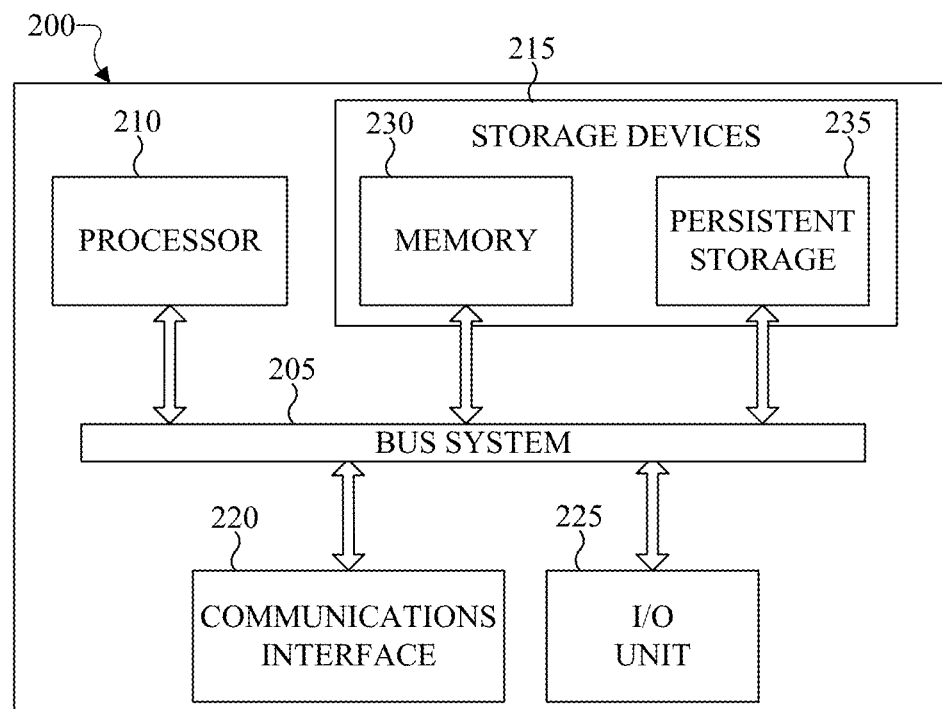
FIGS. 2 and 3 illustrate example devices in a computing system according to various embodiments of the present disclosure.
Figure 3:
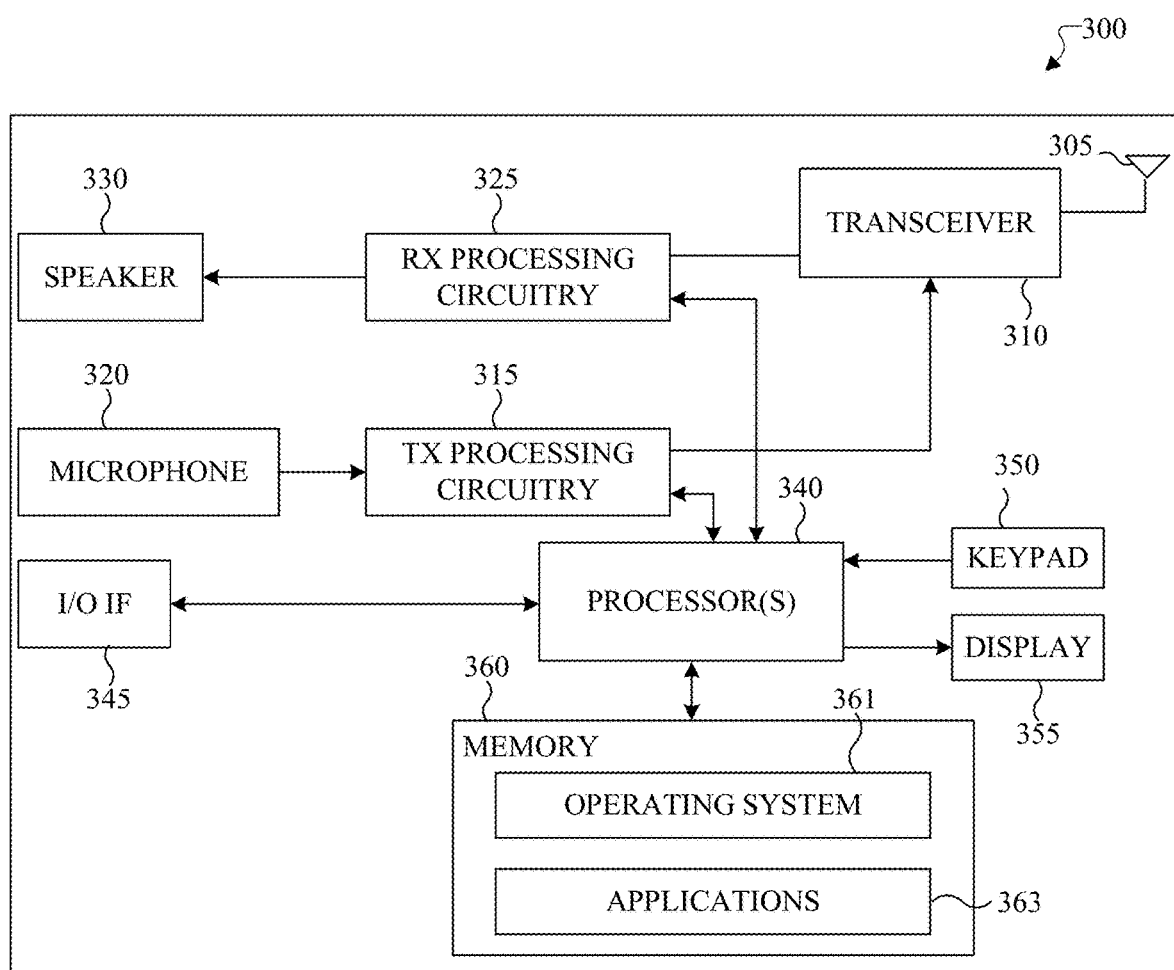

FIGS. 2 and 3 illustrate example devices for communicating traffic flows over a network according to embodiment of the present disclosures. In particular, FIG. 2 illustrates an example server 200, and FIG. 3 illustrates an example client device 300. The server 200 could represent the server 104 in FIG. 1, and the client device 300 could represent one or more of the client devices 106-115 in FIG. 1.

As shown in FIG. 2, the server 200 includes a bus system 205, which supports communication between one or more processors 210, at least one storage device 215, at least one communications interface 220, and at least one input/output (I/O) unit 225.

The processor(s) 210 execute instructions that may be loaded into a memory 230, such as instructions for performing a view field-aware point cloud streaming. The processor(s) 210 may include any suitable number(s) and type(s) of processors or other devices in any suitable arrangement. Example types of processor(s) 210 include microprocessors, microcontrollers, digital signal processors, field programmable gate arrays, application specific integrated circuits, and discreet circuitry. The processor(s) 210 is configured to perform operations for unlocking an electronic device with an authenticated wearable device.

The memory 230 and a persistent storage 235 are examples of storage devices 215, which represent any structure(s) capable of storing and facilitating retrieval of information (such as data, program code, and/or other suitable information on a temporary or permanent basis). The memory 230 may represent a random access memory or any other suitable volatile or non-volatile storage device(s). The persistent storage 235 may contain one or more components or devices supporting longer-term storage of data, such as a ready only memory, hard drive, Flash memory, or optical disc.

The communications interface 220 supports communications with other systems or devices. For example, the communications interface 220 could include a network interface card or a wireless transceiver facilitating communications over the network 102. The communications interface 220 may support communications through any suitable physical or wireless communication link(s).

The I/O unit 225 allows for input and output of data. For example, the I/O unit 225 may provide a connection for user input through a keyboard, mouse, keypad, touchscreen, or other suitable input device. The I/O unit 225 may also send output to a display, printer, or other suitable output device.

In this illustrative embodiment, the server 200 may implement an apparatus that provides a view field-aware point cloud streaming, as will be discussed in greater detail below. Note that while FIG. 2 is described as representing the server 104 of FIG. 1, the same or similar structure could be used in one or more of the client devices 106-115. For example, a laptop or desktop computer could have the same or similar structure as that shown in FIG. 2.

As shown in FIG. 3, the client device 300 includes an antenna 305, a radio frequency (RF) transceiver 310, transmit (TX) processing circuitry 315, a microphone 320, and receive (RX) processing circuitry 325. The client device 300 also includes a speaker 330, a one or more processors 340, an input/output (I/O) interface (IF) 345, a touchscreen 350, a display 355, and a memory 360. The memory 360 includes a basic operating system (OS) program 361 and one or more applications 362.

The RF transceiver 310 receives, from the antenna 305, an incoming RF signal transmitted by another component in a system. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor(s) 340 for further processing (such as for web browsing data).

The TX processing circuitry 315 receives analog or digital voice data from the microphone 320 or other outgoing baseband data (such as web data, e-mail, or interactive video game data) from the processor(s) 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor(s) 340 can include one or more processors or other processing devices and execute the basic OS program 361 stored in the memory 360 in order to control the overall operation of the client device 300. For example, the processor(s) 340 could control the reception of forward channel signals and the transmission of reverse channel signals by the RF transceiver 310, the RX processing circuitry 325, and the TX processing circuitry 315 in accordance with well-known principles. In some embodiments, the processor(s) 340 includes at least one microprocessor or microcontroller.

The processor(s) 340 is also capable of executing other processes and programs resident in the memory 360. The processor(s) 340 can move data into or out of the memory 360 as required by an executing process. In some embodiments, the processor(s) 340 is configured to execute the applications 362 based on the OS program 361 or in response to signals received from external devices or an operator. The processor(s) 340 is also coupled to the I/O interface 345, which provides the client device 300 with the ability to connect to other devices such as laptop computers and handheld computers. The I/O interface 345 is the communication path between these accessories and the processor(s) 340.

The processor(s) 340 is also coupled to the touchscreen 350 and the display 355. The operator of the client device 300 can use the touchscreen 350 to enter data into the client device 300. The display 355 may be a flat screen display or other display capable of rendering text and/or at least limited graphics, such as from web sites.

The processor(s) 340 processes various machine learning algorithms for the flow service classification, state classification and/or resolution classification described in detail below.

The memory 360 is coupled to the processor(s) 340. Part of the memory 360 could include a random access memory (RAM), and another part of the memory 360 could include a flash memory or other read-only memory (ROM). The memory 360 stores a training dataset to train the various machine learning algorithms.

As will be discussed in greater detail below, in this illustrative embodiment, client device 300 receives a signal indicating a shape of a geometric frame and an area of interest in a planar frame. Although FIGS. 2 and 3 illustrate examples of server and client devices, various changes may be made to FIGS. 2 and 3.

For example, various components in FIGS. 2 and 3 could be combined, further subdivided, or omitted and additional components could be added according to particular needs. As a particular example, the processor(s) 340 could be divided into multiple processors, such as one or more central processing units (CPUs) and one or more graphics processing units (GPUs). Also, while FIG. 3 illustrates the client device 300 configured as a mobile telephone or smartphone, client devices could be configured to operate as other types of mobile or stationary devices. In addition, as with computing and communication networks, client devices and servers can come in a wide variety of configurations, and FIGS. 2 and 3 do not limit this disclosure to any particular client device or server.

The present disclosure provides machine learning classifiers to identify the application category, generating network traffic. Unlike Deep Packet Inspection methods which monitor payload of each packet and require high computational and memory requirements, our proposed classifiers perform passive classification with relatively low overhead. An additional advantage is that our proposed classifiers require inspecting only the UDP/IP or TCP/IP headers of incoming packets; thus, the service classification can be performed even if the packets are encrypted (e.g. using TLS/SSL encryption).

This disclosure presents machine learning classifiers which can be used at the base station to detect player state and video resolution for users downloading HTTP streaming video traffic such as YouTube®, Netflix®, Instagram® video and the like. The classifiers can be employed at eNB/gNBs to passively infer the application-level characteristics of the video traffic for the user of interest. Our methods do not require any feedback from the client player at the UE to the eNB. Armed with the knowledge of the streaming video player state and video resolution, an eNB/gNB scheduler can better serve users with streaming video traffic. Unlike conventional approaches which either use Deep Packet Inspection or rely on complicated features, the proposed classifiers use simpler features derived from IP headers of downlink packets. Relying on IP headers only means that our classifiers can be applied even if the user packets are encrypted (e.g. TLS/SSL encryption)) and is independent of the transport layer protocol used.

Figure 4:
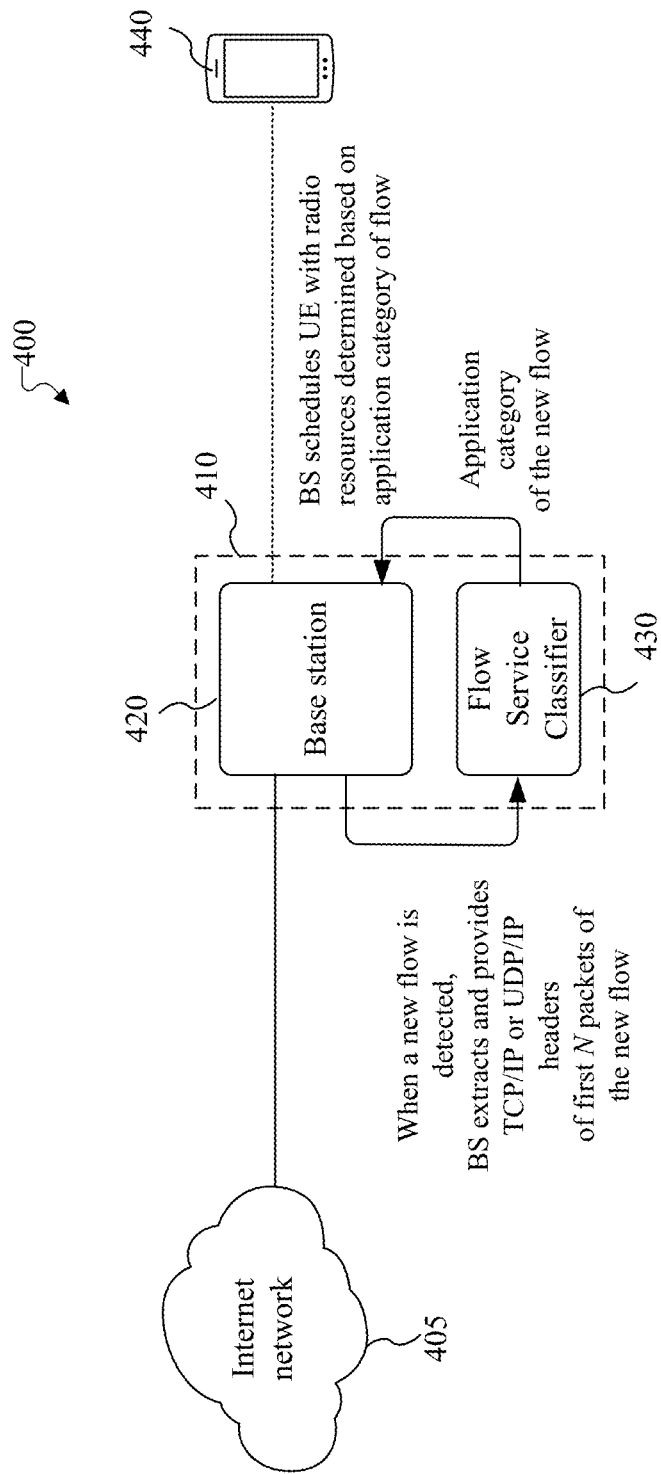
FIG. 4 illustrates an exemplary high-level diagram for a network traffic flow classification according to one embodiment of the present disclosure.

FIG. 4 illustrates an exemplary high-level diagram for network traffic flow classification according to one embodiment of the present disclosure. The embodiment shown in FIG. 4 is for illustration only. Other embodiments are used without departing from the scope of the present disclosure.

The system 410 capable of network traffic flow classification includes a base station 420 (e.g., eNB/gNB) and a flow service classifier 430. The flow service classifier 430 can be embedded into or independent of the base station 420. In other words, the flow service classifier 430 may be located inside or outside the base station 420. The internet network 405 streams multimedia content to a client device (or a user equipment) 440 through the base station 420, using Hypertext Transfer Protocol (HTTP) on top of Transmission Control Protocol (TCP) or User Datagram Protocol (UDP).

The base station 420 can continuously compare the source and destination IP addresses as well as the port numbers by inspecting the UDP/IP or TCP/IP headers of successive incoming packets. An event is triggered if the base station 420 identifies that a new traffic flow is arriving at the network queues belonging to the user of interest. The triggering condition is when the base station detects change in the IP addresses and/or port numbers across successive packets.

Upon the event being triggered, the base station 420 buffers and copies the TCP/IP headers of the first N packets of the traffic flow and send them to the flow service classifier 430. In one embodiment, N can be chosen to be a small number, e.g., 5 packets.

The flow service classifier 430 extracts multiple features from the received headers and feeds the features into a flow service classifier model, which outputs an application category to which the current packet flow belongs. The flow service classifier model can employ one of machine learning algorithms and can be trained using a training data set. By applying the extracted features to the trained classifier model, the flow service classifier 430 determines a service type (e.g., YouTube®, FTP, Web-Click®, Skype®) to which the packet traffic for the user of interest belongs to.

In one embodiment, since the flow service classifier 430 requires access only to the TCP/IP headers which are unencrypted, the flow service classifier 430 works even if the underlying application layer employs packet encryption, e.g. based on Secure Sockets Layer/Transport Layer Security (TLS/SSL).

Armed with knowledge of the application category, a scheduler in the base station 420 can apply different policies as a function of the category of the packet flow(s) for the user of interest. For example, if the user of interest has a video flow, the scheduler in the base station 420 can provide a higher priority while allocating radio resources, relative to a user with a file transfer.

The flow service classifier 430 has three main responsibilities: initial feature extraction, feature selection and classification, which are described in detail below.

The flow service classifier 430 begins with the initial feature extraction, in which flow level features are extracted by inspecting the TCP/IP headers of the first N (e.g., 3, 5, 7, 10, or a higher integer) packets of each flow. Relevant information in UDP/IP or TCP/IP headers includes at least one of a total length of IP datagrams, an IP header length, IP flags, a Source Port, a Destination Port, TCP flags or a window scale in the UDP/IP or TCP/IP headers for a predetermined number of IP packets belonging to the traffic flow.

The flow service classifier 430 extracts multiple features from the relevant information in TCP/IP headers. An example of 11 features used in this disclosure, fields in TCP/IP header required to calculate each feature, the computation and memory overhead to extract each feature are presented in Table 1.

TABLE 1

Exemplary 11 selected features, fields in TCP/IP or UDP/IP header required to calculate each feature, computation and memory overhead with respect to n = number of packets used.

| Features | Required Info from TCP/IP header | Computation Overhead | Memory Overhead |
| --- | --- | --- | --- |
| Server port number | TCP header: Source/Client Port | $O(1)$ | $O(1)$ |
| Client port number | TCP header: Source/Client Port | $O(1)$ | $O(1)$ |
| The count of all the packets with at least a byte payload (Client->server) | IP header: Total Length, Header Length of TCP data TCP header: Offset | $O(n)$ | $O(1)$ |
| The count of all the packets seen with the PUSH bit set in the TCP header. (server->client) | TCP header: TCP Flag (P 0x08 Push) | $O(n)$ | $O(1)$ |
| The count of all the packets seen with the PUSH bit set in the TCP header. (server->client) | TCP header: TCP Flag (P 0x08 Push) | $O(n)$ | $O(1)$ |

TABLE 1-continued

Exemplary 11 selected features, fields in TCP/IP or UDP/IP header required to calculate each feature, computation and memory overhead with respect to n = number of packets used.

| Features | Required Info from TCP/IP header | Computation Overhead | Memory Overhead |
|---|---|---|---|
| The minimum segment size observed during the lifetime of the connection (server->client) | IP header: Total Length, Header Length TCP header: Offset | $O(n)$ | $O(1)$ |
| The average segment size observed during the lifetime of the connection. (server->client) | IP header: Total Length, Header Length TCP header: Offset | $O(n)$ | $O(1)$ |
| The total number of bytes sent in the initial window. (client->server) | IP header: Total Length, Header Length TCP header: TCP Flags(A 0x10 Ack), Offset | $O(1)$ | $O(1)$ |
| The total number of bytes sent in the initial window. (server->client) | IP header: Total Length, Header Length TCP header: TCP Flags(A 0x10 Ack), Offset | $O(1)$ | $O(1)$ |
| The total number of Round-Trip Time (RTT) samples found (client->server) | TCP header: TCP Flags(A 0x10 Ack) | $O(n)$ | $O(1)$ |
| Median of total bytes in IP packet | IP header: Total Length | $O(n\log_2 n)$ | $O(n)$ |

Then, the flow service classifier performs the feature selection. In one embodiment, a large number of features, such as 248 features, can be initially extracted from the TCP/IP headers. The extracted features can be normalized based on the maximum value in TCP/IP headers. To use m features out of the 248, the flow service classifier recursively eliminates features based on feature rankings from a model.

The flow service classifier utilizes various machine learning algorithms including one of Random Forest Model, Support Vector Machines (SVM), Logistic Regression, Naïve Bayes Classifier, Boosted Trees, Nearest Neighbor, Neural Networks and a Multilayer Perceptron.

Figure 5:
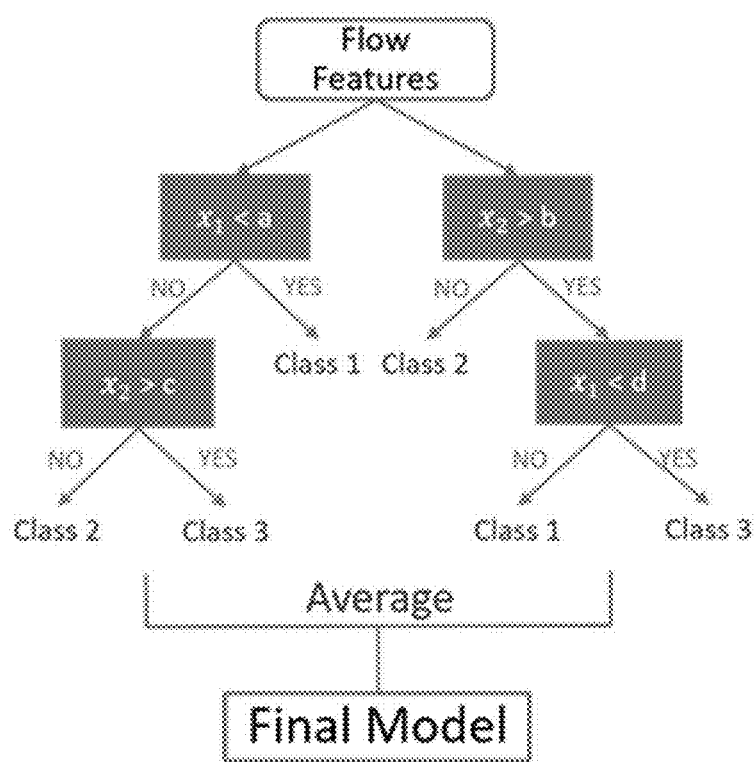
FIG. 5 illustrates exemplary Random Forest decision trees according to one embodiment of the present disclosure.

FIG. 5 illustrates exemplary Random Forest decision trees according to one embodiment of the present disclosure. The embodiment shown in FIG. 5 is for illustration only. Other embodiments are used without departing from the scope of the present disclosure.

The flow service classifier starts with the initial 248 features and trains a Random Forest classifier on these features. The flow service classifier ranks these features based on the mean decrease in Gini impurity and removes the lowest-ranking feature. The flow service classifier then repeats this process until the flow service classifier is left with m features.

Subsequently, the flow service classifier conducts the classification on the traffic flow. A Random Forest classifier is used to classify each flow into an application category. A Random Forest is an ensemble model of decision trees.

At each tree, starting from the top node, one feature is compared to a threshold value. The features traverse to one of the child nodes depending on the result of comparison. Once a leaf with no child nodes is reached, the class represented by the leaf is declared the class of the flow. The final decision is an average of the decision of each decision tree. The feature and associated threshold compared at each node of a tree is optimized by maximizing the reduction in Gini impurity. Each tree is trained using a bootstrap sample of the training dataset.

The classification performance for per-class recall of Random Forest classifier with 11 features and 2 features is presented in Table 2. Recall is the ratio of correctly classified samples in a given class to the total number of samples in that class.

TABLE 2

| | | Per-class Recall | |
|---|---|---|---|
| CLASS | Example Application | w/11 features | w/2 features |
| ATTACK | Internet worm, virus attacks | 0.9278 | N/A |
| BULK | ftp-control, ftp-pasv, ftp-data | 0.9960 | 0.9847 |
| DATABASE | postgres, sqlnet oracle, ingres | 0.9897 | 0.9935 |
| MAIL | imap, pop2/3, smtp | 0.9897 | N/A |
| P2P | KaZaA, BitTorrent, GnuTella | 0.9749 | 0.8569 |
| SERVICES | X11, dns ident, ldap, ntp | 0.9980 | N/A |
| WWW | www | 0.9376 | 0.9911 |

The flow service classifier can achieve average recall of 0.9737 with the 11 features. If the embodiment reduces the number of application categories, the flow service classifier can achieve an average recall of 0.9918 with just 2 features.

In the below description, the feature selection based on UDP/IP or TCP/IP headers extracted from downlink packets are discussed in detail.

A tradeoff between a classification accuracy and a feature extraction overhead can be found compared achieved by using between 2 features to 11 features. The 11 features presented above are selected using a fast correlation-based filter by considering the symmetric uncertainty of features. The embodiment further reduced the number of features by removing ones that may require additional information other than the UDP/IP or TCP/IP headers.

One of the trade-offs in the 11 features described in Table 1 is that some of the features (e.g. "The minimum segment size observed during the lifetime of the connection (client→server)) requires inspecting the TCP header of the packets arriving from the user over the uplink direction (user→base station). This can complicate practical classifier implementations if extracting features requires inspecting UDP/IP or TCP/IP headers of packets arriving in both downlink and uplink direction.

In one embodiment, a subset of above features, based on certain practical considerations such as those described above, can also be used for training the flow service classifier. Five features are so chosen to rely solely on UDP/IP or TCP/IP headers extracted from downlink packets only as shown in Table 3.

TABLE 3

| Features | Required Info from TCP/IP header |
| --- | --- |
| Server port number | TCP header: Source/Client Port |
| Client port number | TCP header: Source/Client Port |
| The count of all the packets seen with the PUSH bit set in the TCP header. (server→client) | TCP header: TCP Flags (P 0x08 Push) |
| The average segment size observed during the lifetime of the connection. (server→client)* | IP header: Total Length, Header Length TCP header: Offset |
| Median of total bytes in IP packet | IP header: Total Length |

Following classifier training, the average cross-validation classification accuracy equals 0.9734 (or 97.34%). The per-class classification accuracy assuming 7 different service categories is shown in Table 4.

TABLE 4

| Class | Attack | Bulk | Database | Mail | P2P | Services | WWW |
| --- | --- | --- | --- | --- | --- | --- | --- |
| Accuracy | 0.919 | 0.992 | 1 | 1 | 0.986 | 0.994 | 0.913 |

As described above, the flow service classifier can achieve over 99% traffic classification accuracy with a small number of features (e.g. 2) by extracting features from TCP/IP headers of just the first 5 packets of a flow.

In one embodiment, the flow service classifier can utilize a Multi-layer Perceptron (MLP) architecture for the packet service classification. The flow service classifier considers the 11 features. The flow service classifier utilizes the MLP with three hidden layers and sigmoid activation functions at each layer. The MLP model is trained with cross-entropy loss function for 150 epochs and achieves maximum testing accuracy of 0.8306.

Random Forest is computationally more efficient compared to the MLP and achieves higher classification accuracy. MLP takes significantly more time to train. However, with more training data, it can potentially achieve better results.

Figure 6:
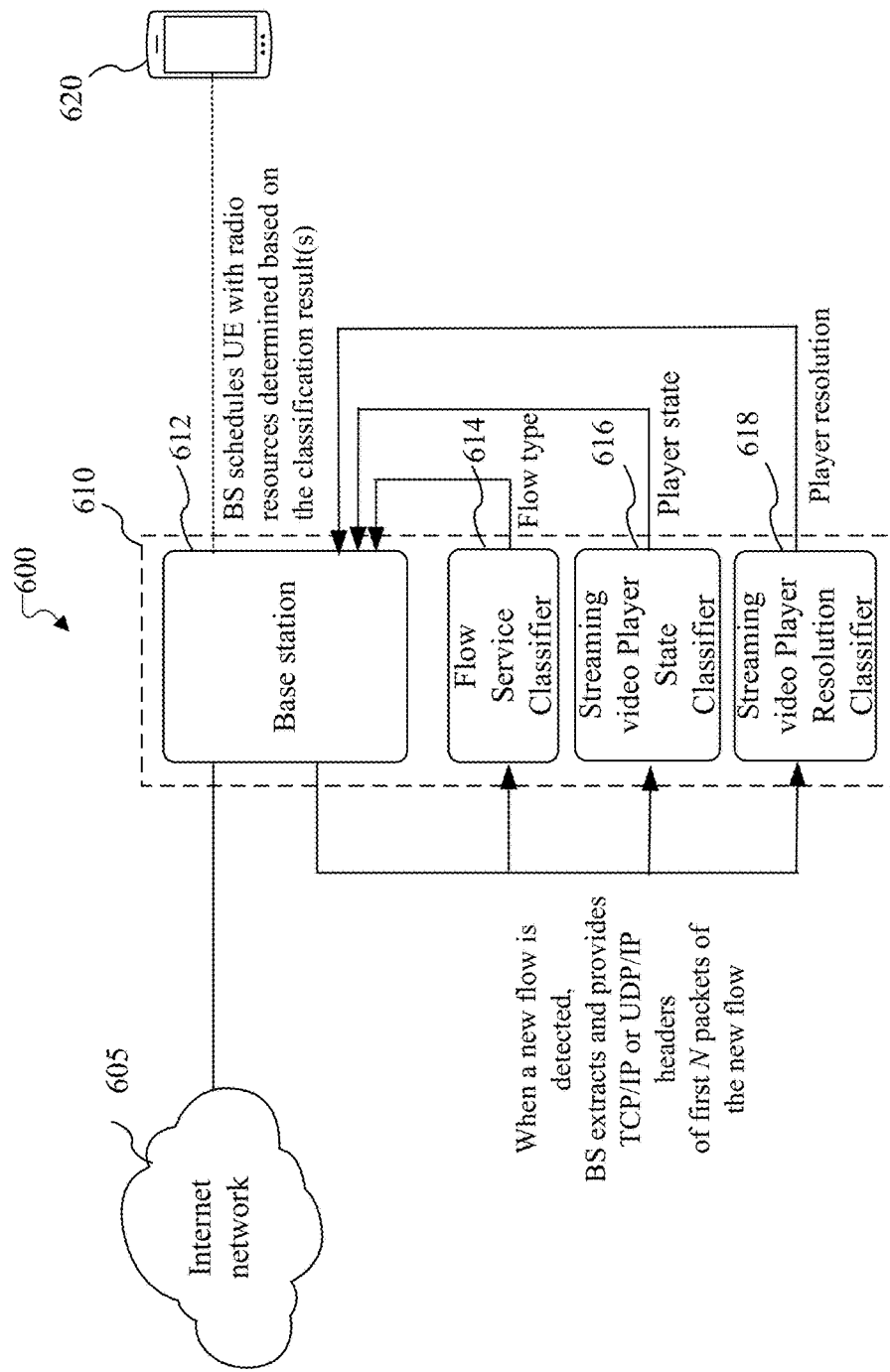
FIG. 6 illustrates an exemplary high-level diagram for a flow service classification, a streaming video player state detection and a streaming video resolution detection according to one embodiment of the present disclosure.

FIG. 6 illustrates an exemplary high-level diagram for the flow service classification and the video player state and video resolution detection according to one embodiment of the present disclosure. The embodiment shown in FIG. 6 is for illustration only. Other embodiments are used without departing from the scope of the present disclosure.

The system 610 includes a base station 612 (e.g., eNB/gNB), a flow service classifier 614, a video player state classifier 616 and a streaming video resolution classifier 618. The flow service classifier 614, the video player state classifier 616 and the streaming video player resolution classifier 618 can be embedded into or independent of the base station 612. In other words, the flow service classifier 614, the video player state classifier 616 and the streaming video player resolution classifier 618 may be located inside or outside the base station 612. The internet network 605 streams multimedia content to a client device (or a user equipment) 620 through the base station 420, using Hypertext Transfer Protocol (HTTP) on top of Transmission Control Protocol (TCP) or User Datagram Protocol (UDP).

Similarly to the base station 420 of the embodiment illustrated in FIG. 4, the base station 612 includes an experience-aware scheduler and streams multimedia content to a client device 620 using HTTP on top of Transmission Control Protocol (TCP) or User Datagram Protocol (UDP).

If the flow service classifier 614 classifies a traffic flow as a video streaming, then the video player state classifier 616 classifies the state of a video player in the client device 620, and the streaming video player resolution classifier 618 determines the resolution of the video player in the client device 620.

The goal of player state and video resolution detections is to optimize the delivery of streaming video, the majority of which is sent via HTTP adaptive streaming. In one embodiment, the components of the experience-aware scheduler can include a service classifier, a player state classifier and a video resolution classifier.

The flow service classifier 614 determines a service type to which the packet traffic for the user of interest belongs to. Once the estimated service type for the user of interest is a streaming video, the streaming video player state classifier 616 determines the client player state (whether a buffering state or steady state) and the streaming video player resolution classifier 618 determines an encoding resolution (e.g., 240p/360p/480p/720p/1080p/1440p or higher resolutions) for that user.

The streaming video player state classifier 616 and the streaming video player resolution classifier 618 have two main responsibilities: feature extraction and classification, which are described outlines in the sections below. The streaming video player state classifier has two main responsibilities, feature extraction and classification, which are described outlines in the sections below. The same features extracted for the streaming video player state classifier 616 also can be used for the streaming video player resolution classifier 618.

The streaming video player state classifier 616 and the streaming video player resolution classifier 618 utilize various machine learning algorithms including one of Random Forest Model, Support Vector Machines (SVM), Logistic Regression, Naïve Bayes Classifier, Boosted Trees, Nearest Neighbor, Neural Networks and a Multilayer Perceptron. The streaming video player state classifier 616 and the streaming video player resolution classifier 618 are trained using training dataset before processing the features extracted from UDP/IP or TCP/IP headers of real-time traffic flows.

The streaming video player state classifier 616 uses the number of downlink packets as its features. In one embodiment, the feature set includes both the number of downlink packets and the total downlink packet length.

The number of downlink packets can be calculated by counting the packets arriving at each client queue within a time window $T_w$. The total downlink packet length can be calculated by aggregating the total length advertised in packet IP headers within a time window.

The features are extracted by assembling measurements of the number of downlink packets and the total downlink packet length within the last N windows. Thus, a feature vector can consist of N features if only the number of IP packets are used, or 2N features if both the number of IP packets and total IP packet size are used.

These features require analyzing both downlink and uplink features, both features require analyzing only downlink packets, making the methods provided in this disclosure suitable for deployment at base station schedulers. The features do not require access to packet inter-arrival times.

The features can be extracted by counting arriving packets at client queue and accessing the packet IP headers. No information from transport layer headers are required. Hence the features used in this disclosure is independent of the transport layer protocols used.

Furthermore, since the embodiments of the present disclosure require access to packet IP headers at most, the player state classifier and video resolution classifier work even when packets are encrypted (e.g., TLS/SSL encryption, which do not encrypt packet IP headers). The features are extracted by inspecting the IP headers of downlink video traffic. This disclosure uses a sampling period of $T_w$ and a feature vector is constructed with the last n samples.

The streaming video player state classifier 616 calculates the total number of downlink packets and/or the total packet lengths during each sampling period. If both total number of packets and total packet lengths are used, the samples are concatenated into a length-2n vector.

In the case of start of a video traffic flow for player state classification or start of the steady state for resolution detection where number of available samples is smaller than n, the feature vector is filled with mean of existing samples. For example, with n=3, only considering number of packets, the feature vectors extracted at each time $t=kT_w$ is illustrated in Table 1.

TABLE 1

| t | x |
|---|---|
| $T_w$ | $[p_1, p_1, p_1]$ |
| $2T_w$ | $\left[\frac{p_1 + p_2}{2}, p_1, p_2\right]$ |
| $3T_w$ | $[p_1, p_2, p_3]$ |
| $4T_w$ | $[p_2, p_3, p_4]$ |
| $5T_w$ | $[p_3, p_4, p_5]$ |
| $6T_w$ | $[p_4, p_5, p_6]$ |
| $7T_w$ | $[p_5, p_6, p_7]$ |

In Table 1, with n=3, x are feature vectors, $p_j$ is number of downlink packets during $t \in [(j-1)Tw, jTw]$, j=1, 2, 3 . . . .

Since it does not need to wait for all n samples to be available, the detection latency is $T_w$, i.e., the first detection output occurs at $T_w$. Both the streaming video player state classifier and the streaming video player resolution classifier may use similar features (number of downlink packets and/or total packet length during each sampling period), but may use different $T_w$ and n to construct feature vectors.

The streaming video player state classifier 616 utilizes various machine learning algorithms including one of Random Forest Model, Support Vector Machines (SVM), Logistic Regression, Naïve Bayes Classifier, Boosted Trees, Nearest Neighbor, Neural Networks and a Multilayer Perceptron.

In this embodiment, the streaming video player state classifier uses a Random Forest classifier that classifies a length-2 feature vector into 3 possible classes. The classification performance for player state detection is presented in Table 2, where the mean classification accuracies over 5-fold cross-validation are presented for different $T_w$ and n, also with only number of packets as features or with both number of packets and total packet lengths.

TABLE 2

Mean accuracy of Random Forest classifier for player state detection and 2 player states.

| Player State Detection | | | n | | | | |
|---|---|---|---|---|---|---|---|
| 5-fold CV | | | 5 | 10 | 15 | 20 | 25 |
| $T_{w/s}$ | 0.1 | # Pkt | 0.817 | 0.834 | 0.847 | 0.855 | 0.863 |
| | | both | 0.929 | 0.948 | 0.960 | 0.968 | 0.973 |
| | 0.3 | # Pkt | 0.838 | 0.860 | 0.873 | 0.883 | 0.892 |
| | | both | 0.956 | 0.973 | 0.979 | 0.982 | 0.983 |
| | 0.5 | # Pkt | 0.851 | 0.873 | 0.894 | 0.909 | 0.920 |
| | | both | 0.969 | 0.980 | 0.984 | 0.985 | 0.988 |
| | 1 | # Pkt | 0.865 | 0.905 | 0.918 | 0.922 | 0.920 |
| | | both | 0.980 | 0.985 | 0.989 | 0.990 | 0.990 |
| | 2 | # Pkt | 0.898 | 0.916 | 0.917 | 0.917 | 0.920 |
| | | both | 0.985 | 0.990 | 0.990 | 0.990 | 0.991 |

Assuming a minimum accuracy of 95%, a small $T_w$ of 0.1 s can be used with n=15 samples, or a slightly larger $T_w$ of 0.3 s with only n=5 samples.

Table 3 shows performance of such a 3-state classifier. Clearly, 3-state classification is more difficult since it results in lower accuracy with the same feature parameters. For example, for >90% accuracy: For 2 states minimum Tw=0.1 s and n=5 samples; For 3 states, minimum Tw=0.3 s and n=25 samples.

In another embodiment, a stopping state (state of the client's video player when the user of the client player has paused playback or stopped playback) can also be added to the video states.

TABLE 3

Mean accuracy of Random Forest classifier for player state detection and three states including a depleting state.

| Player State | | | | | | n | | | | | |
|---|---|---|---|---|---|---|---|---|---|---|---|
| | | | 5 | | 10 | | 15 | | 20 | | 25 |
| Detection 5-fold CV | | | 2 States | 3 States | 2 States | 3 States | 2 States | 3 States | 2 States | 3 States | 2 States | 3 States |
| $T_{w/s}$ | 0.1 | both | 0.929 | 0.796 | 0.948 | 0.827 | 0.960 | 0.843 | 0.968 | 0.856 | 0.973 | 0.866 |
| | 0.2 | Both | 0.944 | 0.824 | 0.965 | 0.854 | 0.974 | 0.870 | 0.979 | 0.880 | 0.981 | 0.888 |
| | 0.3 | both | 0.956 | 0.838 | 0.973 | 0.866 | 0.979 | 0.882 | 0.982 | 0.893 | 0.983 | 0.902 |
| | 0.5 | both | 0.969 | 0.858 | 0.980 | 0.887 | 0.984 | 0.904 | 0.985 | 0.919 | 0.988 | 0.932 |
| | 1 | both | 0.980 | 0.884 | 0.985 | 0.921 | 0.989 | 0.938 | 0.990 | 0.943 | 0.990 | 0.945 |
| | 2 | both | 0.985 | 0.917 | 0.990 | 0.946 | 0.990 | 0.949 | 0.990 | 0.950 | 0.991 | 0.950 |
| | 5 | both | 0.989 | 0.947 | 0.991 | 0.953 | 0.992 | 0.961 | 0.990 | 0.964 | 0.992 | 0.963 |

For the performance verification purpose, the streaming video player resolution classifier 618 considers, for example, four possible resolution classes: 144 pixels, 240 pixels, 480 pixels and 720 pixels. The resolution class can include may other video resolutions, such as 1080 pixels or a higher resolution.

The classification performance for player resolution detection is presented in Table 4, where the mean classification accuracies over 5-fold cross-validation are presented for different $T_w$ and n, also with only number of packets as features or with both number of packets and total packet lengths.

TABLE 4

Mean accuracy of Random Forest classifier for video resolution detection.

| Player State Detection | | | n | | | | |
|---|---|---|---|---|---|---|---|
| 5-fold CV | | | 5 | 10 | 15 | 20 | 25 |
| $T_{w/s}$ | 1 | # Pkt | 0.689 | 0.889 | 0.919 | 0.933 | 0.938 |
| | | both | 0.688 | 0.893 | 0.923 | 0.935 | 0.938 |
| | 1.5 | # Pkt | 0.773 | 0.909 | 0.928 | 0.936 | 0.937 |
| | | both | 0.785 | 0.913 | 0.929 | 0.932 | 0.937 |
| | 2 | # Pkt | 0.864 | 0.921 | 0.938 | 0.939 | 0.941 |
| | | both | 0.876 | 0.922 | 0.937 | 0.933 | 0.940 |
| | 3 | # Pkt | 0.902 | 0.932 | 0.940 | 0.945 | 0.949 |
| | | both | 0.905 | 0.939 | 0.941 | 0.943 | 0.947 |
| | 5 | # Pkt | 0.924 | 0.949 | 0.954 | 0.952 | 0.965 |
| | | both | 0.941 | 0.950 | 0.952 | 0.954 | 0.955 |
| | 10 | # Pkt | 0.949 | 0.969 | 0.969 | 0.977 | 0.977 |
| | | both | 0.959 | 0.972 | 0.964 | 0.974 | 0.968 |

Assuming a minimum accuracy of 95%, a $T_w$ of 5 s can be used with n=15 samples. If the accuracy requirement is relaxed to 90%, a small $T_w$ of 1 s can be used with n=15 samples with only the number of packets as features.

The accuracies of the machine learning classifiers have been evaluated with non-uniform sampling duration, for example, due to non-idealities in the sampling clock at the base station. Assuming the sampling interval Tw is normally distributed with standard deviation σ=(1E-5, 1E-4, 1E-3, 1E-2, 1E-1)*Tw, the performance accuracies of the state detection and the streaming video player resolution classifiers do not vary significantly with σ.

Overall, the machine learning classifiers can achieve over 95% detection accuracy for both player state and video resolution detection with small sampling periods by counting the number of downlink packets during each sampling period and/or summing the packet lengths. There is a tradeoff between the detection accuracies, $T_w$ and n. The larger $T_w$ is, the higher the detection latency. The larger n is, the higher the complexity for the classification models.

In one embodiment, multi-layer perceptron (MLP) architecture can be used for the streaming video player state classification. The streaming video player state classifier used the MLP with 2 hidden layers and sigmoid activation functions at each layer. The model is trained with cross-entropy loss function for 20 epochs. The mean testing accuracies over 5-fold cross-validation for different combinations of $T_w$ and n are shown in Table 4.

TABLE 4

Mean accuracy of MLP classifier for the streaming video player state detection.

| Player State Detection | | | n | | | | |
|---|---|---|---|---|---|---|---|
| 5-fold CV | | | 5 | 10 | 15 | 20 | 25 |
| $T_{w/s}$ | 1 | # Pkt | 0.914 | 0.935 | 0.948 | 0.955 | 0.961 |
| | | both | 0.908 | 0.927 | 0.941 | 0.948 | 0.952 |
| | 1.5 | # Pkt | 0.941 | 0.958 | 0.962 | 0.964 | 0.965 |
| | | both | 0.933 | 0.951 | 0.954 | 0.953 | 0.953 |
| | 2 | # Pkt | 0.951 | 0.958 | 0.959 | 0.966 | 0.977 |
| | | both | 0.948 | 0.954 | 0.954 | 0.958 | 0.972 |
| | 3 | # Pkt | 0.953 | 0.962 | 0.979 | 0.982 | 0.982 |
| | | both | 0.950 | 0.952 | 0.973 | 0.979 | 0.980 |
| | 5 | # Pkt | 0.952 | 0.983 | 0.986 | 0.985 | 0.984 |
| | | both | 0.943 | 0.967 | 0.973 | 0.976 | 0.977 |
| | 10 | # Pkt | 0.923 | 0.959 | 0.951 | 0.935 | 0.918 |
| | | both | 0.863 | 0.927 | 0.916 | 0.896 | 0.872 |

Random Forest is computationally more efficient compared to MLP. MLP can achieve similar accuracies with just the number of packets in each sampling period as features.

After the flow service classification, the streaming video player state classification and the streaming video player resolution classification are complete, the experience-aware scheduler in the base station 612 incorporates the service type, streaming video state and resolution into the derivation of the scheduler metrics in order to provide higher radio resources to users and improves their video quality of experience.

Figure 7:
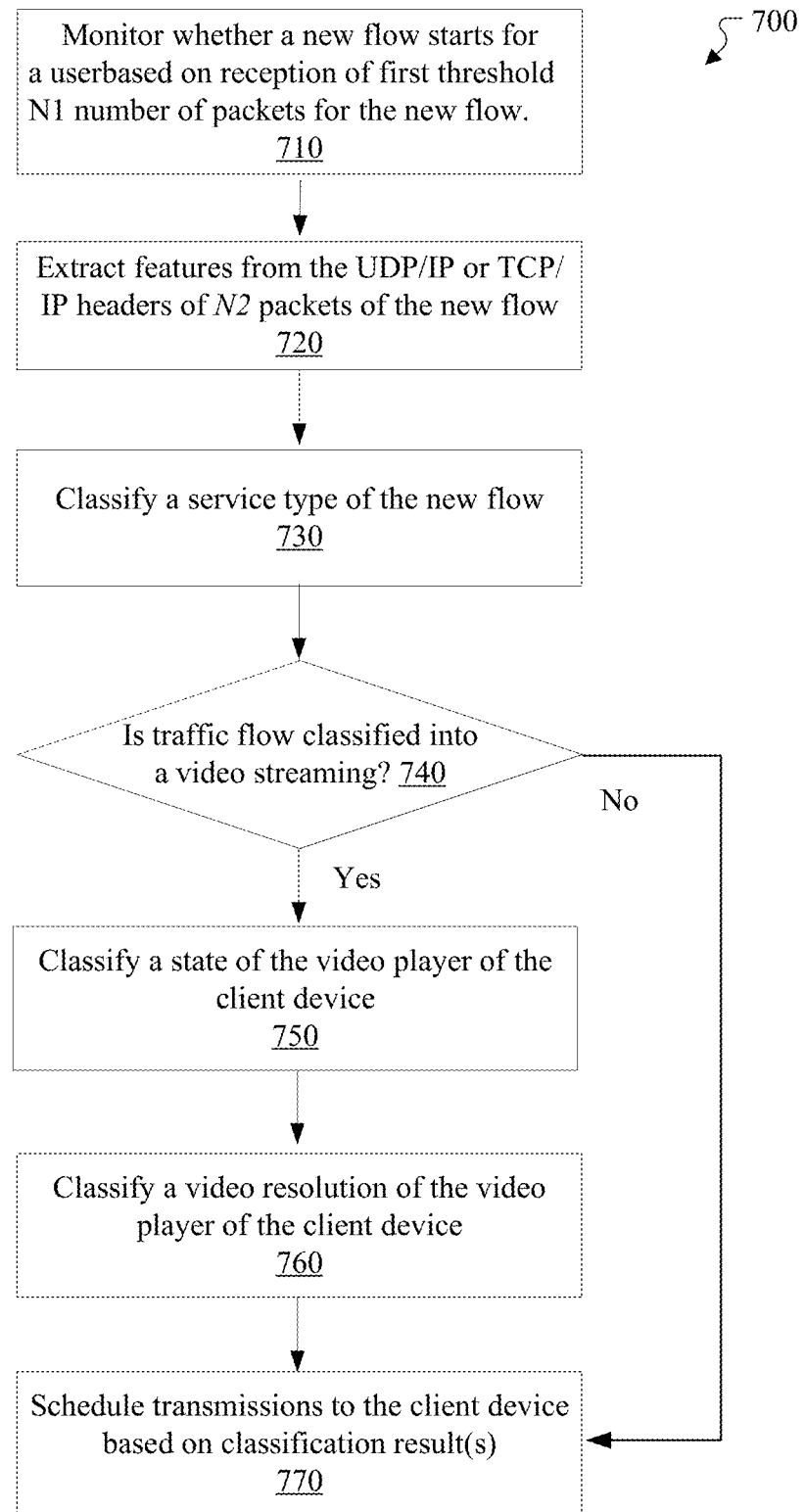
FIG. 7 illustrates an exemplary flowchart for a flow service classification, a streaming video player state and a streaming video player resolution detection according to one embodiment of the present disclosure.

FIG. 7 illustrates an exemplary flowchart for service classification, player state and player resolution detection according to one embodiment of the present disclosure. The embodiment of the method 700 shown in FIG. 7 is for illustration only. One or more of the components illustrated in FIG. 7 can be implemented in specialized processing circuitry configured to perform the noted functions or one or more of the components can be implemented by one or more processors executing instructions to perform the noted functions. Other embodiments are used without departing from the scope of the present disclosure.

In step 710, the base station (or the flow service classifier inside or outside the base station) monitors whether a new traffic flow is arriving at the network queues belonging to the user of interest. Once a new traffic flow starts, the first N of packets of the new traffic flow are buffered. N is a predetermined integer more than a threshold number, such as 3, 5, 7, or a higher number.

In step 720, the flow service classifier extracts multiple features from IP addresses and/or port numbers in the UDP/IP or TCP/IP headers of the M packets in the traffic flow. M is a predetermined integer more than a threshold number, such as 3, 5, 7 or a higher number. The streaming video player state classifier classifies the service type of the traffic flow by applying the extracted features to a machine learning service classification model that has been trained with a training dataset.

The features can be extracted from at least one of a total length of IP datagrams, an IP header length, IP flags, a Source Port, a Destination Port, TCP flags or a window scale in the UDP/IP or TCP/IP headers for a predetermined number of IP packets belonging to the traffic flow.

In one embodiment, the additional features can be optionally extracted from statistics of other detected traffic flows measured within a time-window around each packet of a predetermined number of IP packets belonging to the traffic flow. The statistics of other detected traffic flows includes the number of the detected traffic flows measured within the time-window.

Suppose that the start of flow is detected at time t=T, and other starts of different flows are also detected in the interval [T−T1, T+T1]. The flow service classifier can extract a feature of how many different flows are detected within [T−T1, T+T1]. This feature is useful to detect a video streaming against other service flows. For example, when a user downloads a web-page, typically multiple flows are opened between a user's host computer and the web server(s) hosting the web-page. Note that different parts of a web-page are different HTTP objects which open up separate TCP connections and different flows (sessions). The number of such flows could be different for web-browsing as opposed to streaming video, FTP and the like.

In step 740, it is determined whether the traffic flow is classified into a video streaming or not. If the traffic flow is not classified as a video streaming, the scheduler in the base station incorporates the classified service type of traffic flow into the derivation of the scheduler metrics in order to provide higher radio resources to users in step 770. If the traffic flow is classified as a video streaming, the method proceeds to step 750.

In step 750, when the traffic flow is classified into a video streaming, the streaming video player state classifier classifies the state of the video player in the client device, among a plurality of states of the video player. In one embodiment, the video player can be in one of a buffering state or steady state which are described in detail below.

The buffering state starts when a client video player has a low or empty buffer. When in the buffering state, in order to quickly build up the playback buffer, the client video player requests subsequent video segments as soon as the previous segment has been received. The buffering state typically occurs at the start of a video playback, or after the buffer has been depleted in the middle of a video playback so that the playback is stalled. During the buffering state, the client's video player may request subsequent video segments as soon as the previous segment has been received, resulting in more frequent requests and sustained large download volume The steady state refers to when a client video player has saturated its buffer and tries to keep its buffer at a high level to allow for smooth video playback. The steady state starts when a client video player has accumulated a certain buffer size after which video player starts subsequently. When in the steady state, since the playback buffer drains out, the video player maintains its playback buffer at a relatively constant level by periodically requesting newer video segments.

In addition to detecting a buffering state and a steady state, the video state classifier can detect a depleting state. The video player is said to be in depleting state if the rate of change the playback buffer is negative for a certain amount of time. By detecting a depleting state, the scheduler can allocate more resources to the user of interest and pro-actively prevent the video player from stalling.

Subsequently, the video player requests a new segment every τ seconds, where τ is the duration of a video segment, or after the previous segment has been received, whichever is longer. When in the steady state, the client video player requests new segments much less frequently compared to in the buffering state.

Conventional schedulers lack awareness of the streaming video player state at each client device. As a consequence, client's streaming video player in the buffering state which needs to download large amount of video data quickly to build up buffers and starts playback are treated equally as clients in the steady state which only needs to download a single segment periodically. This results in large initial playback delays for users in the buffering state and frequent stalling for users in the steady state.

An experience-aware scheduler according to the present disclosure, on the other hand, derives its knowledge of the client player state and incorporates it into its radio resource scheduling decisions. Video players in the client devices in the buffering state should be scheduled more aggressively in order to reduce the initial playback delay or stalling duration in the middle of a video playback.

In step 760, when the state of the video player is classified as a steady state, the streaming video player resolution classifier can identify one of several typical video resolutions: e.g., 144p, 240p, 360p, 480p, 720p, 1080p, 1440p, or a higher resolution. Knowing the playback resolution of a video client, the base station scheduler can estimate the encoding rate and the client buffer status. The base station can adjust its scheduling policy based on the buffer status of each client's video player. For example, the system can predict if stalling is imminent from a depleting buffer and schedule accordingly. If the state of the video player is classified as states other than the steady state, the method proceeds to step 770 without a streaming video player resolution classification.

From the queues for each user, the base station copies and sends downlink packet IP headers of video traffic to player state classifier. The streaming video player state classifier extracts the features from IP headers and feeds these features into its classification model, which output the current player state as either a buffering state or steady state. The current player state is sent to the base station.

If the video player is in the steady state, the base station then copies and sends downlink packet IP headers to the streaming video player resolution classifier, which extract features from IP headers and feeds features into its classification model. It outputs the current video resolution, which is sent back to the base station.

In step 770, once the flow service classification, the streaming video player state classification and/or the streaming video player resolution classification are complete, the scheduler in the base station incorporates the service type, streaming video player state and resolution into the derivation of the scheduler metrics in order to provide higher radio resources to users and improves a video quality of experience.

The methods described in the present disclosure estimate the state and resolution by passive inspection of IP packet headers from the user queues. Like the deep packet Inspection, the method obtains high levels of classification accuracy, without incurring the high computational overhead and associated central processing unit (CPU)/microprocessor without interlocked piped stages (MIPS) requirements.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the applicants to refer to structures known to those skilled in the relevant art and is not intended to invoke 35 U.S.C. § 112(f).

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An apparatus for improving a service quality in a communication network, the apparatus comprising:
   a memory; and
   a communication interface configured to obtain Transmission Control Protocol (TCP)/Internet Protocol (IP) or user datagram protocol (UDP)/IP headers of packets sent to a client device;
   at least one processor operably connected to the memory, the at least one processor configured to:
      detect a start of a traffic flow; and
      buffer a first number of packets for the traffic flow, the first number of packets exceeding a first threshold;
      extract features from the UDP/IP or TCP/IP headers of a second number of packets belonging to the detected traffic flow, the second number of packets exceeding a second threshold; and
      obtain a flow service classifier for classifying a service type of the traffic flow; and
      classify the service type of the traffic flow by applying the extracted features to the flow service classifier.

2. The apparatus of claim 1, wherein the start of the traffic flow is detected upon a reception of a packet in which at least one of an IP Protocol Field, an IP Source address Field, an IP Destination address Field, a Source Port Field and a Destination Port Field contained in the UDP/IP or TCP/IP header within the packet, is different from those contained within a UDP/IP or TCP/IP header of a previously detected traffic flow.

3. The apparatus of claim 1, wherein the features are extracted from at least one of a total length of IP datagrams, an IP header length, IP flags, a Source Port, a Destination Port, TCP flags or a window scale in the TCP/IP headers for a predetermined number of IP packets belonging to the traffic flow;
   wherein the features are optionally further extracted from statistics of other detected traffic flows measured within a time-window around each packet of a predetermined number of IP packets belonging to the traffic flow, wherein the statistics of detected traffic flows include the number of the detected traffic flows measured within the time-window.

4. The apparatus of claim 1, wherein, when the traffic flow is classified as a video streaming, the at least one processor is further configured to:
   extract at least one feature based on measuring, within a predetermined time-window, at least one of a number of packets or a total length of packets from the UDP/IP or TCP/IP headers belonging to the traffic flow;
   obtain a streaming video player state classifier for predicting a state of a streaming video player of the client device among a plurality of states; and
   determine the streaming video player state of the client device by applying the extracted at least one feature to the streaming video player state classifier.

5. The apparatus of claim 4, wherein the plurality of states of the streaming video player comprise:
   a buffering state indicating that the streaming video player is accumulating a playback buffer until a size of buffered data meets a third threshold while requesting for a newer video chunk when a previous video chunk is received;
   a steady state indicating that the streaming video player is accumulating the playback buffer while requesting for a newer video chunk when either one chunk worth of time has elapsed or the previous video chunk is received, whichever occurs later;
   a depleting state indicating that a rate of change in the size of buffered data is negative for a threshold time, and that the streaming video player faces an imminent possibility of entering a stalling state; and
   the stalling state indicating that the playback buffer is empty.

6. The apparatus of claim 5, wherein, when the state of the streaming video player is classified as the steady state, the at least one processor is further configured to:
   obtain a streaming video resolution classifier for determining a resolution of the streaming video player of the client device; and
   determine the resolution of the streaming video player of the client device among a plurality of resolutions of the streaming video player, by applying the extracted at least one feature to the streaming video resolution classifier, wherein the plurality of resolutions of the streaming video player define a streaming video quality including one of 144 pixels, 240 pixels, 360 pixels, 480 pixels, 720 pixels, 1080 pixels or higher resolutions at which the streaming video player plays a streaming video to an end-user.

7. The apparatus of claim 6, wherein the at least one processor is further configured to derive a scheduling metric for scheduling resources for transmitting packets to the client device by incorporating the service type of the traffic flow, the state of the streaming video player, and the resolution of the streaming video player.

8. The apparatus of claim 6, wherein each of the flow service classifier, the streaming video player state classifier, and the streaming video player resolution classifier utilizes a machine learning algorithm including one of Random Forest Model, Support Vector Machines (SVM), Logistic Regression, Naïve Bayes Classifier, Boosted Trees, Nearest Neighbor, Neural Networks or a Multilayer Perceptron.

9. A method for improving a service quality in a communication network, the method comprising:
   detecting a start of a traffic flow to a client device;
   buffering a first number of packets for the traffic flow, the first number of packets exceeding a first threshold;
   extracting features from user datagram protocol (UDP)/Internet Protocol (IP) or Transmission Control Protocol (TCP)/IP headers of a second number of packets belonging to the detected traffic flow, the second number of packets exceeding a second threshold;
   obtaining a flow service classifier for predicting a service type of the traffic flow; and
   determining the service type of the traffic flow by applying the extracted features to the flow service classifier.

10. The method of claim 9, wherein the start of the traffic flow is detected upon a reception of a packet in which at least one of an IP Protocol Field, an IP Source address Field, an IP Destination address Field, a Source Port Field and a Destination Port Field contained in the UDP/IP or TCP/IP header within the packet, is different from those contained within a UDP/IP or TCP/IP header of a previously detected traffic flow.

11. The method of claim 9, wherein the features are extracted from at least one of a total length of IP datagrams, an IP header length, IP flags, a Source Port, a Destination Port, TCP flags or a window scale in the TCP/IP headers for a predetermined number of IP packets belonging to the traffic flow, wherein the features are optionally further extracted from statistics of other detected traffic flows measured within a time-window around each packet of a predetermined number of IP packets belonging to the traffic flow, wherein the statistics of detected traffic flows include the number of the detected traffic flows measured within the time-window.

12. The method of claim 9, further comprising, when the traffic flow is classified as video streaming:

extracting at least one feature based on measuring, within a predetermined time-window, at least one of a number of packets or a total length of packets from the UDP/IP or TCP/IP headers;

obtaining a streaming video player state classifier for classifying a state of a streaming video player of the client device among a plurality of states; and classifying the streaming video player state of the client device by applying the extracted at least one feature to the streaming video player state classifier.

13. The method of claim 12, wherein the plurality of states of the streaming video player comprise:

a buffering state indicating that the streaming video player is accumulating a playback buffer until a size of buffered data meets a third threshold while requesting for a newer video chunk when a previous video chunk is received;

a steady state indicating that the streaming video player is accumulating the playback buffer while requesting for a newer video chunk when either one chunk worth of time has elapsed or the previous video chunk is received, whichever occurs later; and a depleting state indicating that a rate of change in the size of buffered data is negative for a threshold time, and that the streaming video player faces an imminent possibility of entering a stalling state; and a stalling state indicating that the playback buffer is empty.

14. The method of claim 13, further comprising:

when the state of the streaming video player is classified as the steady state:

obtaining a streaming video player resolution classifier for determining a resolution of the streaming video player of the client device; and determining the resolution of the streaming video player of the client device among a plurality of resolutions of the streaming video player, by applying the extracted at least one feature to the streaming video player resolution classifier, wherein the plurality of resolutions of the streaming video player define a streaming video quality including one of 144 pixels, 240 pixels, 360 pixels, 480 pixels, 720 pixels, 1080 pixels or higher resolutions at which the streaming video player plays a streaming video to an end-user.

15. The method of claim 14, further comprising deriving a scheduling metric for scheduling resources for transmitting packets to the client device by incorporating the service type of the traffic flow, the state of the streaming video player, and the resolution of the streaming video player.

16. A non-transitory computer-readable medium comprising program code for improving a service quality in a communication network, wherein the program code that, when executed by a processor, causes the processor to:

detect a start of a traffic flow to a client device;

buffer a first number of packets for the traffic flow, the first number of packets exceeding a first threshold;

extract features from user datagram protocol (UDP)/ Internet Protocol (IP) or Transmission Control Protocol (TCP)/IP headers of a second number of packets belonging to the detected traffic flow, the second number of packets exceeding a second threshold;

obtain a flow service classifier for predicting a service type of the traffic flow; and determine the service type of the traffic flow by applying the extracted features to the flow service classifier.

17. The non-transitory computer-readable medium of claim 16, wherein the start of the traffic flow is detected upon a reception of a packet in which at least one of an IP Protocol Field, an IP Source address Field, an IP Destination address Field, a Source Port Field and a Destination Port Field contained in the UDP/IP or TCP/IP header within the packet, is different from those contained within a UDP/IP or TCP/IP header of a previously detected traffic flow.

18. The non-transitory computer-readable medium of claim 16, wherein the features are extracted from at least one of a total length of IP datagrams, an IP header length, IP flags, a Source Port, a Destination Port, TCP flags or a window scale in the TCP/IP headers for a predetermined number of IP packets belonging to the traffic flow, wherein the features are optionally further extracted from statistics of other detected traffic flows measured within a time-window around each packet of a predetermined number of IP packets belonging to the traffic flow, wherein the statistics of detected traffic flows include the number of the detected traffic flows measured within the time-window.

19. The non-transitory computer-readable medium of claim 16, further comprising program code that, when executed by the processor, causes the processor to:

when the traffic flow is classified as video streaming:

extract at least one feature based on measuring, within a predetermined time-window, at least one of a number of packets or a total length of packets from the UDP/IP or TCP/IP headers;

obtain a streaming video player state classifier for classifying a streaming video player state of the client device among a plurality of states; and classify the streaming video player state of the client device by applying the extracted at least one feature to the streaming video player state classifier.

20. The non-transitory computer-readable medium of claim 18, further comprising program code that, when executed by the processor, causes the processor to:

when the state of a streaming video player is classified as a steady state:

obtain a streaming video player resolution classifier for determining a resolution of the streaming video player of the client device; and determine the resolution of the streaming video player of the client device among a plurality of resolutions of the streaming video player, by applying the extracted at least one feature to the streaming video resolution classifier, wherein the plurality of resolutions of the streaming video player define a streaming video quality including one of 144 pixels, 240 pixels, 360 pixels, 480 pixels, 720 pixels, 1080 pixels or higher resolutions at which the streaming video player plays a streaming video to an end-user.

* * * * *